(12) United States Patent
Eckert

(10) Patent No.: US 8,047,955 B2
(45) Date of Patent: Nov. 1, 2011

(54) TWO-STAGE MACHINE TOOL GEARING, IN PARTICULAR SPINDLE GEARING

(75) Inventor: Harald Eckert, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 649 days.

(21) Appl. No.: 12/293,088

(22) PCT Filed: Mar. 9, 2007

(86) PCT No.: PCT/EP2007/052224
§ 371 (c)(1),
(2), (4) Date: Sep. 16, 2008

(87) PCT Pub. No.: WO2007/107460
PCT Pub. Date: Sep. 27, 2007

(65) Prior Publication Data
US 2009/0098972 A1    Apr. 16, 2009

(30) Foreign Application Priority Data
Mar. 21, 2006   (DE) .......................... 10 2006 012 837

(51) Int. Cl.
*F16H 3/44* (2006.01)
(52) U.S. Cl. ........................................ 475/296; 475/293
(58) Field of Classification Search .................. 475/293, 475/296, 300
See application file for complete search history.

(56) References Cited

U.S. PATENT DOCUMENTS

| | | | |
|---|---|---|---|
| 3,382,736 A | 5/1968 | Abbott | |
| 3,774,476 A | 11/1973 | Söhnlein et al. | |
| 4,195,537 A * | 4/1980 | Sessler | 475/157 |
| 4,592,251 A * | 6/1986 | Mason | 475/157 |
| 4,827,799 A * | 5/1989 | Jang | 475/258 |
| 6,428,442 B1 * | 8/2002 | Turgay et al. | 475/321 |
| 6,605,019 B1 | 8/2003 | Eckert | |
| 7,300,376 B2 | 11/2007 | Eckert et al. | |
| 7,351,180 B2 * | 4/2008 | Yoo | 475/293 |

FOREIGN PATENT DOCUMENTS

| | | |
|---|---|---|
| DE | 2 145 009 | 3/1973 |
| DE | 199 17 673 A1 | 10/2000 |
| DE | 102 38 653 A1 | 7/2003 |
| DE | 102 41 006 A1 | 3/2004 |
| DE | 10 2004 003 684 A1 | 8/2005 |
| DE | 10 2004 003 685 A1 | 8/2005 |
| EP | 0 566 926 A1 | 10/1993 |
| WO | WO-86/07423 | 12/1986 |
| WO | WO-2004/023004 A1 | 3/2004 |

* cited by examiner

*Primary Examiner* — Ha D. Ho
(74) *Attorney, Agent, or Firm* — Davis & Bujold, P.L.L.C.

(57) ABSTRACT

A two-stage machine tool transmission, in particular a spindle drive transmission, includes a planetary gearset in which a spindle or a spindle insert can be connected to a drive output of a transmission, which has a first drive output shaft and the second drive output shaft, such that the first drive output shaft is connected in a rotationally fixed manner to a drive input shaft and can optionally be connected, via a first shift element, to a sun gear of the planetary gearset. The second drive output shaft is connected in a rotationally fixed manner to a carrier of the planetary gearset. A ring gear of the planetary gearset is connected in a rotationally fixed manner to the transmission housing and a second shift element is provided such that a connection between the spindle or a spindle insert and, optionally, the first or the second drive output shaft, is possible.

11 Claims, 5 Drawing Sheets

TWO-STAGE MACHINE TOOL GEARING, IN PARTICULAR SPINDLE GEARING

This application is a national stage completion of PCT/EP2007/052224 filed Mar. 9, 2007, which claims priority from German Application Serial No. 10 2006 012 837.0 filed Mar. 21, 2006.

FIELD OF THE INVENTION

The present invention concerns a two-stage machine tool transmission, in particular a spindle drive transmission for high torques and high speeds.

BACKGROUND OF THE INVENTION

Machine tool transmissions, in particular spindle transmissions, are known from the prior art and usually comprise a planetary transmission and a shift device for shifting to the desired gear.

For example, DE 10 2004 003 684 A1 by the present Applicant describes a machine tool transmission, in particular a spindle transmission in which force or torque transmission takes place directly from the drive output shaft of the transmission to the spindle. The spindle is arranged co-axially with respect to the drive output shaft.

Further from DE 10 2004 003 685 A1 by the present Applicant, a machine tool transmission, in particular a spindle transmission is known, in which force or torque transmission takes place directly from the drive output shaft of the transmission to the spindle. The spindle is arranged co-axially with the drive output shaft. In this case, a rotary duct is integrated in the drive input shaft, which serves as a transfer device for coolant liquids, oils or air between the transmission output and the spindle.

DE 102 41 006 A1 by the present Applicant describes an electromagnetic shift device for a two-stage planetary gearset with a drive input shaft and a drive output shaft, a sun gear, a ring, gear, a planetary gear carrier with planetary gears, a transmission housing and a sliding shift sleeve for shifting to a first gear in which the ring gear can be coupled to the housing and a second gear in which the ring gear can be coupled to the sun gear, such that the sliding shift sleeve can be moved by an electromagnet consisting of magnet coils and an armature. The armature can rotate, but is axially fixed onto the sliding sleeve.

From DE 199 17 673 A1 by the present Applicant, a shift device for a two-stage planetary transmission is known. In the known planetary transmission, the drive input shaft is connected to a sun gear and the drive output shaft to a planetary gear carrier, a ring gear of the planetary transmission can be positively coupled such that a sliding shift sleeve to a transmission housing or to the sun gear and the shift sleeve can be moved co-axially with respect to the drive input shaft by way of an electric control element to the various shift positions. The control element is an electromagnet whose armature is connected to propel the shift sleeve.

Owing to their centric structure, machine tool transmissions with a space-saving planetary drive for increasing the torque are generally also suitable for high speeds. However, the designs known from the prior art limit the high speeds because in the straight-through mode (i=1:1, motor output speed=transmission output speed) the complete planetary drive with its sun gear, planetary gears, planetary gear carrier and the ring gear is driven, even though this is only necessary for producing a transmission ratio for the first gear step. In such situations, the high rotation speeds have an adverse influence on the vibration values. In addition, accelerating to maximum speed take a longer time.

For the transmission of high torques in the first gear step (i.e., with a transmission ratio), large diameters are required at the drive output, which additionally increase the rotation masses and also permit only large seal diameters. This affects the transmission temperature adversely, since the friction increases over-proportionally with diameter and speed.

The purpose of the present invention is to provide a two-stage machine tool transmission, in particular a spindle transmission for high torques and high speeds, whose vibration values are low. In addition, the temperature of the transmission should remain as low as possible.

SUMMARY OF THE INVENTION

In a machine tool, the vibration values are decisively responsible for the surface condition and the temperature for the precision of the objects being machined and, therefore, have a decisive influence on quality. The use of belts at high speeds is technically not feasible, since the noise emissions prescribed by law cannot be complied with. Accordingly, in the transmission, according to the invention, the transfer of force and torque from the transmission to the spindle takes place directly.

Thus, a two-stage machine tool transmission is proposed, which comprises a planetary gearset, a drive input shaft, a first drive output shaft connected in a rotationally fixed manner to the input shaft and which can be releasably connected to the sun gear of the planetary gearset such that a first shift element and a second drive output shaft connected in a rotationally fixed manner to the carrier of the planetary gearset and a second shift element is also provided, which produces a releasable connection between the spindle and the first or the second drive output shaft, according to choice. In this way, the straight-through mode is produced by the connection of the first drive output shaft to the spindle with the first shift element disengaged. The gear with a transmission ratio is produced by connecting the spindle to the second drive output shaft with the first shift element engaged.

The concept, according to the invention, ensures that in the straight-through mode the planetary gearset is decoupled so that the rotating masses are considerably reduced and the acceleration times are shorter.

According to the invention, the ring gear of the planetary gearset is connected in a rotationally fixed manner to the housing of the transmission so that in the first gear stage (with the transmission ratio) it is not concomitantly driven, which reduces the rotation masses and the acceleration time up to maximum speed is shorter. Furthermore, the play-free position of the ring gear enables the teeth to roll more precisely and thus increases the quietness of running in the first gear stage (with transmission ratio).

According to the invention, a blocking device can be provided, which prevents the concomitant rotation of the second drive output shaft in the direct mode. This improves the efficiency of the transmission since the bearings of the second output shaft can create a drag torque. For this purpose, in an advantageous embodiment, a spring-loaded pin is inserted into a bore of the planetary gear carrier so that the planetary gear carrier is locked. The spring-loaded pin is actuated by actuating the first shift element or the second shift element.

In an advantageous further development of the invention, the spindle is arranged co-axially with the first drive output shaft. Moreover, the second drive output shaft is made as a hollow shaft co-axial with the first output shaft. The first output shaft is fitted in the second output shaft with no play.

The shift elements can be made as claw-type or fictional clutches or as synchronizers and can be actuated electrically, mechanically, electromechanically, hydraulically, pneumatically and/or by spring force.

Preferably, the first shift element arranged on the drive input side is integrated in the transmission and contains a sealing point. The second shift element is arranged on the drive output side outside the transmission. According to an advantageous further development, the spindle or a spindle insert can serve as a support for the second shift element.

Advantageously, in the transmission, according to the invention, a rotary duct is integrated to serve as a transfer device for coolant liquids, oils or air between the transmission output and the spindle. A minimum oil level is therefore no longer necessary so splash losses no longer take place, which would cause heating of the transmission. As described in the present Applicant's DE 10 2004 003 685 A1, which is hereby incorporated by reference, the rotary duct can be integrated in the first drive output shaft and can comprise two sealing discs that serve as sealing points and as a way for accommodating speed differences.

BRIEF DESCRIPTION OF THE DRAWINGS

The invention will now be described, by way of example, with reference to the accompanying drawings in which.

DETAILED DESCRIPTION OF THE INVENTION

Figure 1:
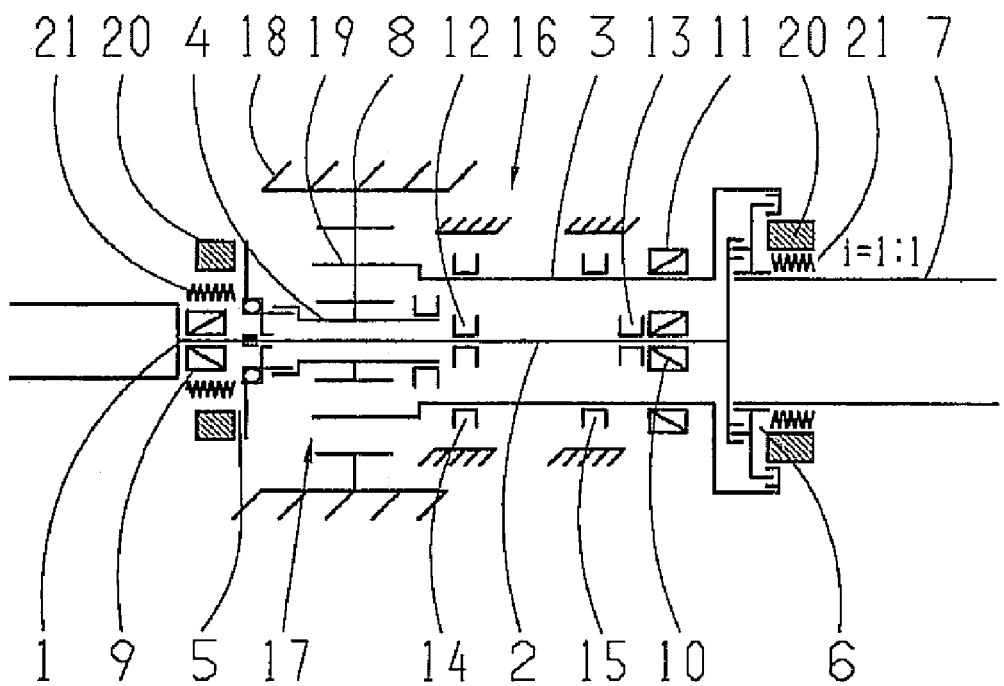
FIG. 1 is a schematic view of an embodiment of the machine tool transmission in which the straight-through mode is engaged according to the invention.

Referring to FIG. 1, a machine tool transmission 16 comprises a planetary gearset 17, a drive input shaft (motor shaft) 1, and a first drive output shaft 2 which is connected in a rotationally fixed manner to the drive input shaft 1 and which can be connected releasably to a sun gear 4 of the planetary gearset 17 by way of a first shift element 5. In addition, a second drive output shaft 3 is provided, which is connected in a rotationally fixed manner to a carrier 19 of the planetary gearset 17, and a second shift element 6 is provided, which forms a releasable connection between a spindle 7 or a spindle insert and, optionally, either the first or the second drive output shaft 2 or 3, respectively.

According to the invention, the direct, straight-through mode (second gear stage) is produced by connecting the first drive output shaft 2 to the spindle 7 by way of the second shift element 6 while the first shift element 5 is disengaged. The gear, with a transmission ratio (first gear stage), is engaged by connecting the spindle 7 to the second drive output shaft 3 by way of the second shift element 6 while the first shift element 5 is engaged.

The planetary gearset is engaged by the sun gear 4, via the shift element 5, such that in this case, a connection to the drive output shaft 2 exists. A ring gear 8 is permanently connected in a rotationally fixed manner to a housing 18.

In the straight-through mode, high rotation speeds are transmitted to the spindle 7 by the inner drive output shaft 2. The drive output shaft 2 has a small diameter since in the straight-through mode it is subjected to less torque, resulting in lower circumferential speeds and smaller rotating masses. For that reason, in the case of the drive output shaft 2, radial shaft sealing rings 9, 10 of small diameter can be used on the drive input and drive output sides at the high speeds involved. The high torques are transmitted by the outer drive output shaft 3 so that a larger sealing point 11 on the drive output side is only under load when a transmission ratio is involved and the rotation speeds are substantially lower.

The drive output shaft 2 is fitted inside the drive output shaft 3 with no play by way of oblique or spindle bearings 12, 13. Likewise, the drive output shaft 3 is mounted in the housing 18 with no play by way of oblique or precision bearings 14, 15.

In the example illustrated in FIG. 1, the shift elements 5 and 6 each comprise a solenoid 20 and a spring 21 so that they can be actuated against the spring force preferably by energizing the solenoid.

In FIG. 1 the machine tool transmission 16, according to the invention, is shown with the direct gear or straight-through mode engaged, namely with the shift element 5 disengaged and the shift element 6 engaged so as to form a connection between the drive output shaft 2 and the spindle or spindle insert 7.

Figure 2:
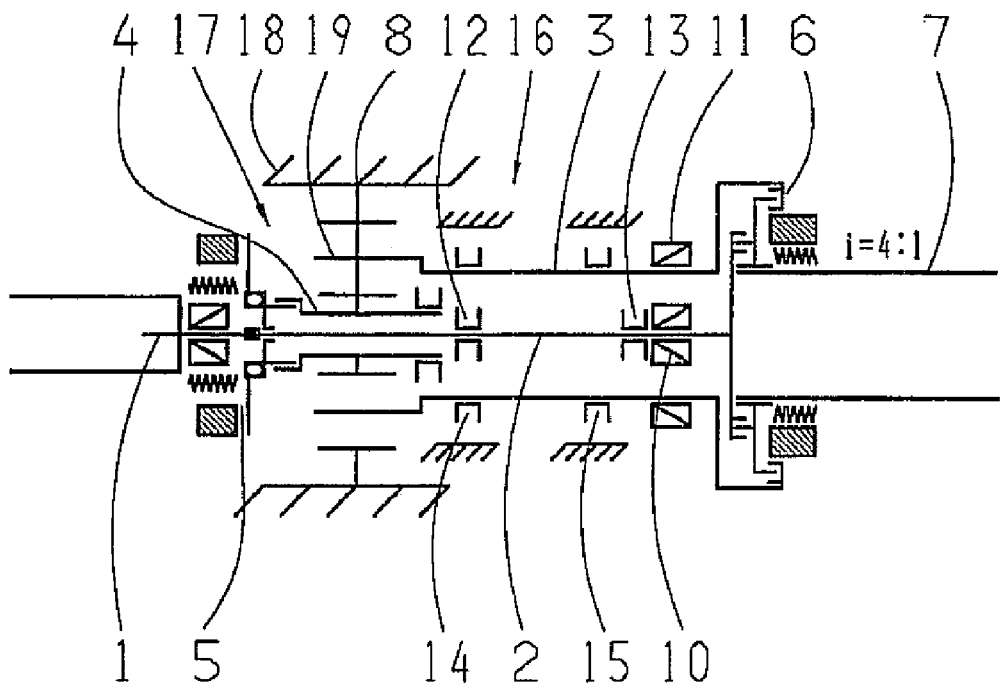
FIG. 2 is a schematic view of a machine tool transmission according to FIG. 1, in which the gear stage with a transmission ratio is engaged.

In FIG. 2, the machine tool transmission 16, according to the invention, is shown with its first gear stage engaged, i.e., with a transmission ratio, namely with the shift element 5 engaged and the shift element 6 engaged so that a connection is formed between the drive output shaft 3 and the spindle or spindle insert 7.

Figure 3:
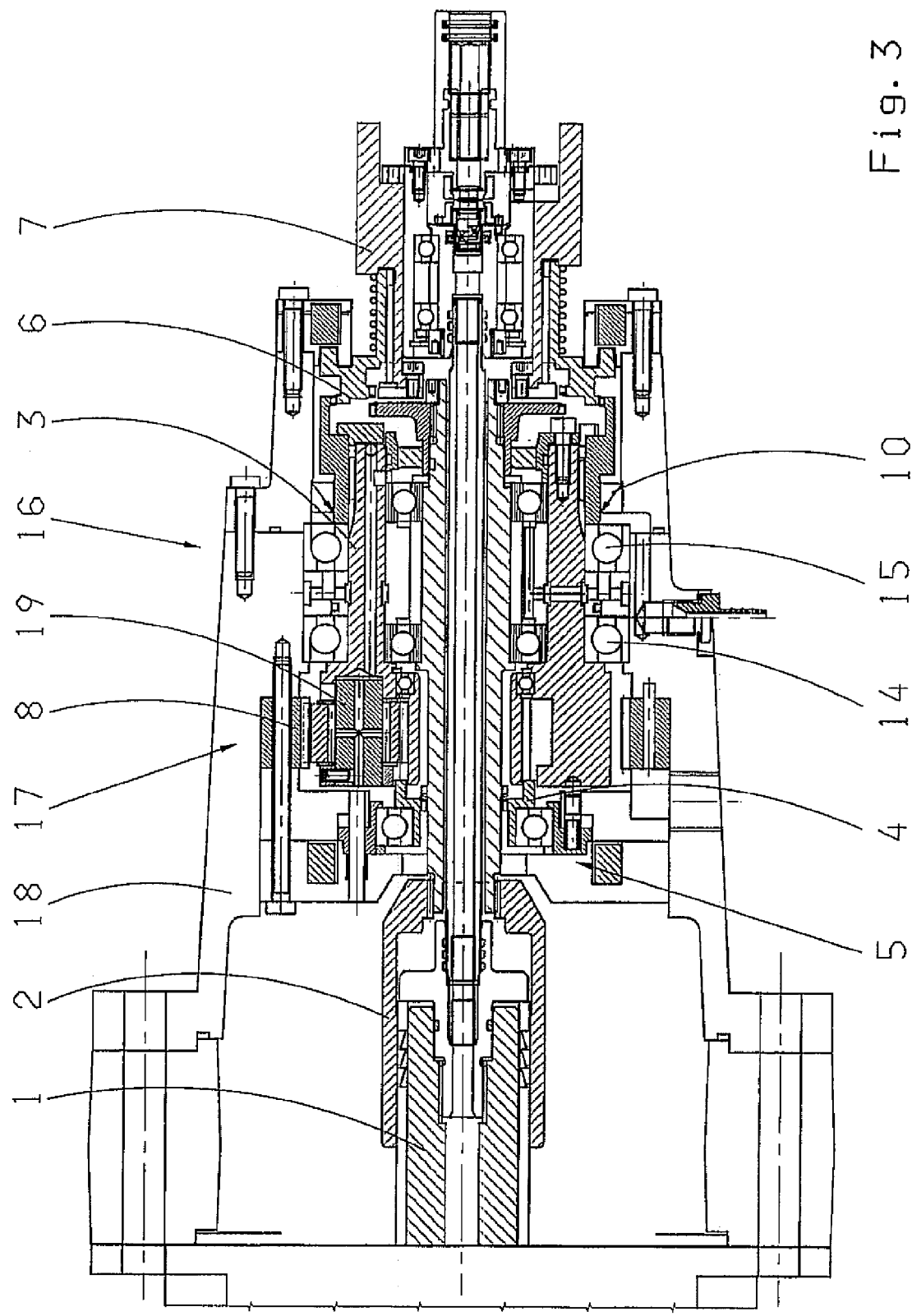
FIG. 3 is a sectional view of a machine tool transmission according to FIG. 1, in which the portions that rotate when the first gear stage (with transmission ratio) is engaged are indicated by shading.
Figure 4:
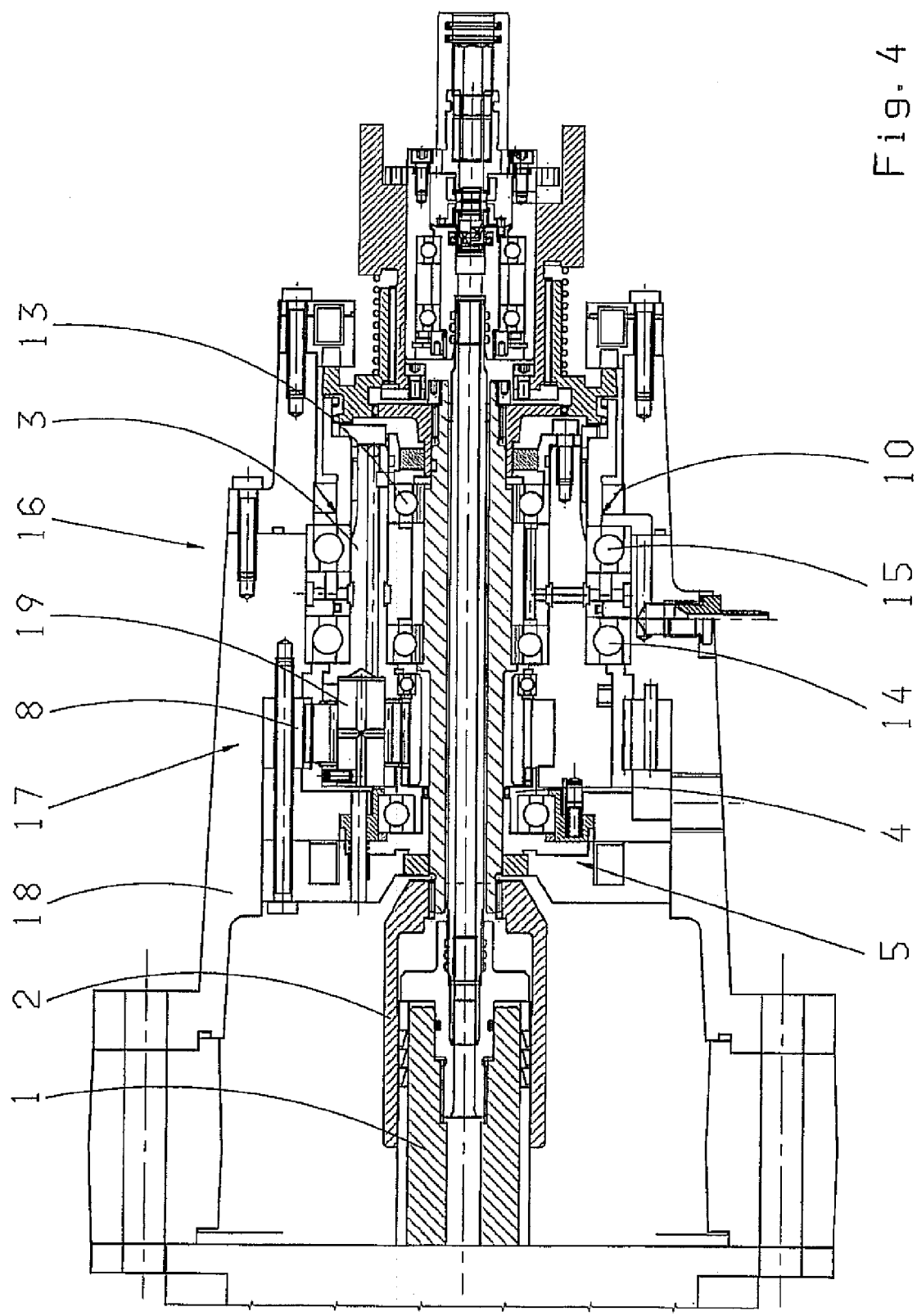
FIG. 4 is a sectional view of a machine tool transmission according to FIG. 1, in which the portions that rotate when the straight-through mode is engaged are indicated by shading.

In FIG. 3, which show a sectional view of the machine tool transmission 16, the portions that rotate when the first gear stage is engaged are indicated by shading, likewise, the portions that rotate in the direct mode are indicated by shading in FIG. 4.

Figure 5A:
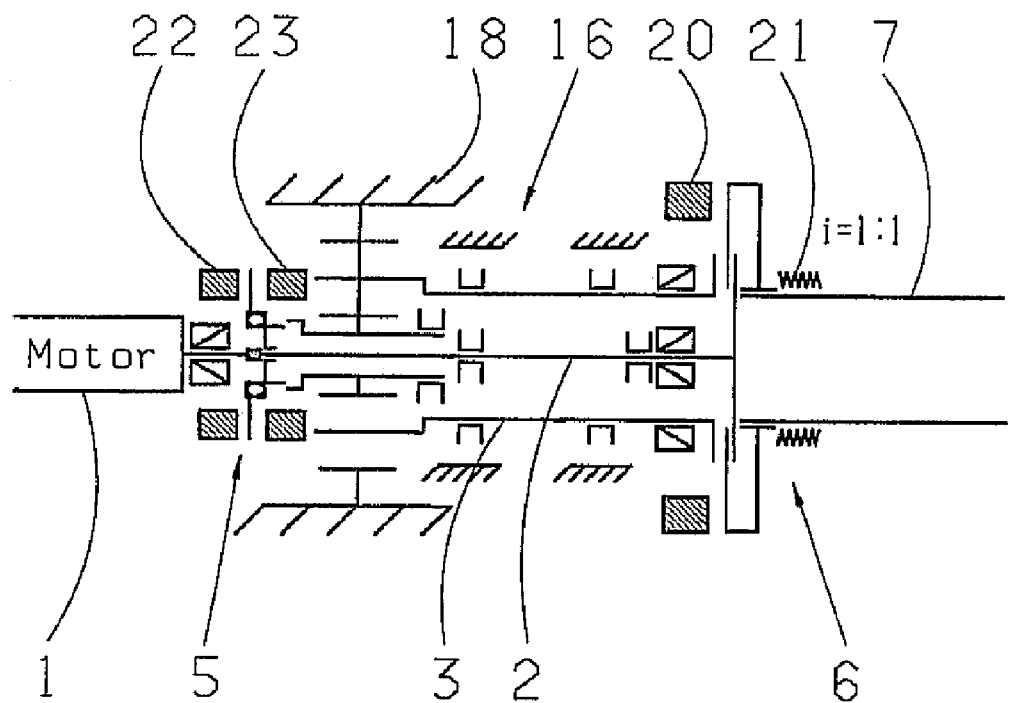
FIGS. 5, 5A and 6, 6A are, in each case, a schematic view of a machine tool transmission, according to the invention, with the first (FIGS. 5, 6) and the second (FIGS. 5A, 5B) gear stage engaged, the two embodiments differing in that the structures of the shift elements are different.
Figure 5:
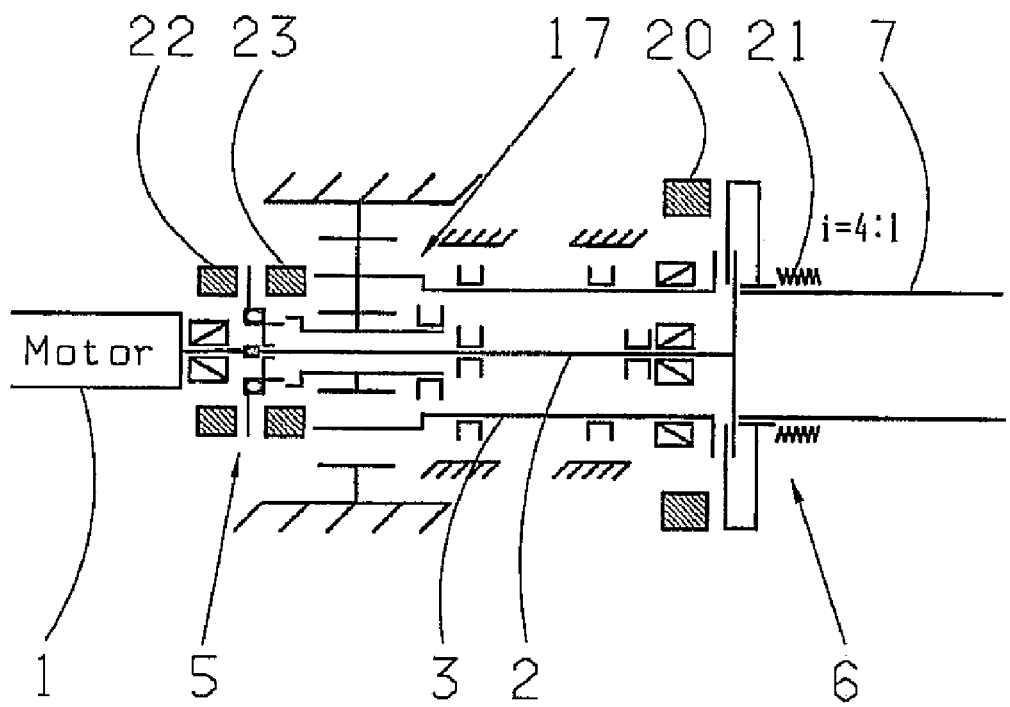

In the example shown in FIGS. 5, 5A the shift element 5 comprises two solenoids 22, 23 and can be actuated in the direction desired by energizing the solenoids appropriately; the shift element 6 has one solenoid 20 and a spring 21, so that it can be actuated against the spring force by energizing the solenoid.

Figure 6A:
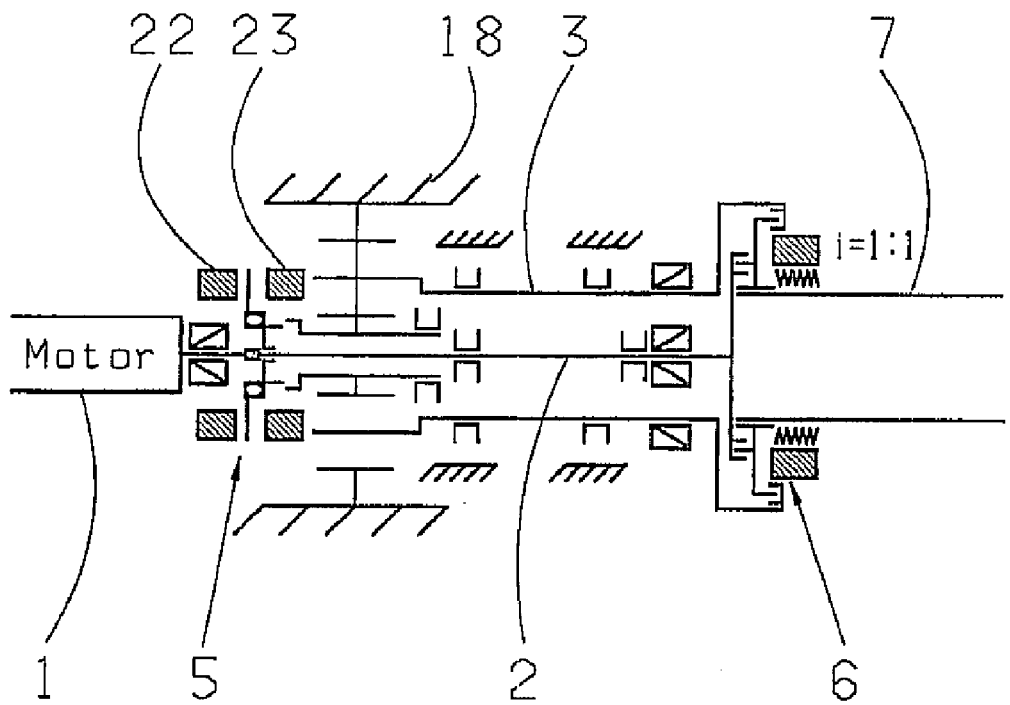
Figure 6:
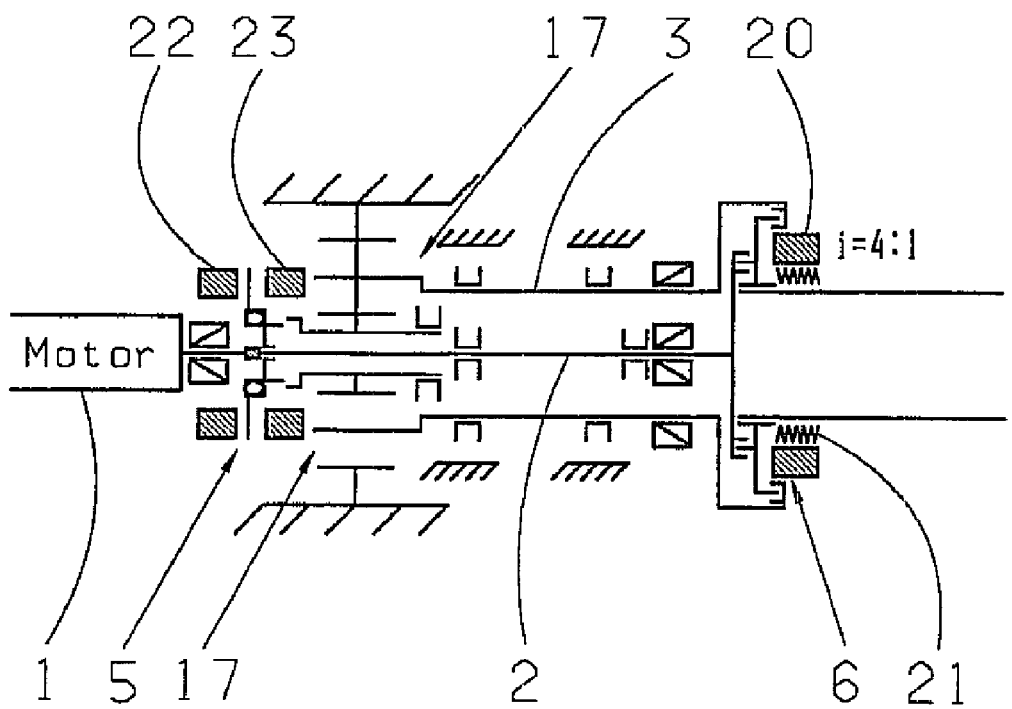

In the example, shown in FIGS. 6, 6A the shift element 5 again has two solenoids 22, 23 and can be actuated in the desired direction by energizing the solenoids appropriately. The shift element 6 has one solenoid 20 and the spring 21, which are arranged on the same side of the shift element so that it can be actuated against the spring force by energizing the solenoid.

For normal adaptation to spindle motors, an integrated solution is also possible. In this, the inner drive output shaft 2 can be part of the rotor so as to reduce the overall length in an advantageous manner.

REFERENCE NUMERALS 1 drive input shaft, motor shaft
2 first drive output shaft 3 second drive output shaft
4 sun gear
5 first shift element
6 second shift element
7 spindle, spindle insert
8 ring gear
9 radial shaft sealing ring
10 radial shaft sealing ring
11 sealing point
12 spindle bearing
13 spindle bearing
14 bearing
15 bearing
16 machine tool transmission
17 planetary gearset
18 housing
19 carrier
20 solenoid
21 spring
22 solenoid
23 solenoid

The invention claimed is:

1. A two-stage machine tool transmission comprising a planetary gearset in which one of a spindle and a spindle insert being connected to one of a first drive output shaft (2) and a second drive output shaft (3) of the transmission such that the first drive output shaft (2) being connected in a rotationally fixed manner to the drive input shaft (1) and being connectable to a sun gear (4) of the planetary gearset (17) by way of a first shift element (5), and the second drive output shaft (3) being connected in a rotationally fixed manner to a carrier (19) of the planetary gearset (17) and a ring gear (8) of the planetary gearset (17) being connected in a rotationally fixed manner to a housing (18) of the transmission, a second shift element (6) releasably connecting one of the spindle (7) and the spindle insert and one of the first drive output shaft (2) and the second drive output shaft (3).

2. The two-stage machine tool transmission according to claim 1, wherein the spindle (7) is coaxial with the first drive output shaft (2), and the second drive output shaft (3) is a hollow shaft and is co-axial with the first drive output shaft (2), the first drive output shaft (2) is fitted inside the second drive output shaft (3), by way of spindle bearings (12, 13), without any play.

3. The two-stage machine tool transmission according to claim 1, wherein a straight-through direct drive mode (second gear stage) is produced by connecting the first drive output shaft (2) to one of the spindle (7) and the spindle insert by way of the second shift element (6) when the first shift element (5) is disengaged, and a drive mode with a transmission ratio (first gear stage) is produced by connecting one of the spindle (7) and the spindle insert to the second drive output shaft (3) by way of the second shift element (6) when the first shift element (5) is engaged.

4. The two-stage machine tool transmission according to claim 1, wherein a locking device prevents simultaneous rotation of the second drive output shaft (3) in the direct drive mode.

5. The two-stage machine tool transmission according to claim 1, wherein the locking device is a spring-loaded pin which is introduced into a bore in the carrier (19) whereby the planetary carrier is locked, and the spring-loaded pin is actuated by actuation of one of the first shift element (5) and the second shift element (6).

6. The two-stage machine tool transmission according to claim 1, wherein the first shift element (5) is integrated in the transmission (16) and the second shift element (6) is arranged on an output side exterior to the transmission (16).

7. The two-stage machine tool transmission according to claim 1, wherein the one of the spindle and the spindle insert (7) is a carrier for the second shift element (6).

8. The two-stage machine tool transmission according to claim 1, further comprising a rotary duct which transfers one of a cooling liquid, oil and air between the spindle (7) and the one of the first drive output shaft (2) and the second drive output shaft (3).

9. The two-stage machine tool transmission according to claim 8, wherein the rotary duct is mounted in the first drive output shaft (2) and comprises two sealing disks which are sealing points and a device for accommodating rotational speed differences.

10. The two-stage machine tool transmission according to claim 1, wherein the shift elements (5,6) are one of claw clutches, friction surface clutches and synchronizers, and are at least one of actuated electrically, electro-mechanically, hydraulically, pneumatically and by spring force.

11. A two-stage spindle drive transmission comprising:
a drive input shaft (1),
a first drive output shaft (2), and
a second drive output shaft (3),
the drive input shaft (1) being fixed to the first drive output shaft (2), the second drive output shaft (3) being hollow and coaxial with the first drive output shaft (2), which centrally passes through the second drive output shaft (3);
a planetary gearset (17) having sun gear (4), a carrier (19) and a ring gear (8), the carrier (19) being fixed to the second drive output shaft (3) and the ring gear (8) being fixed to a transmission housing (18);
a first shift element (5) releasably coupling the first drive output shaft (2) with the sun gear (4); and
a second shift element (6) releasably coupling a spindle (7) with one of the first drive output shaft (2) and the second drive output shaft (3).

* * * * *